June 1, 1954           D. B. COX           2,680,184
METHOD FOR SEVERING OR SLITTING METAL FOIL
Filed Feb. 7, 1951           2 Sheets-Sheet 1
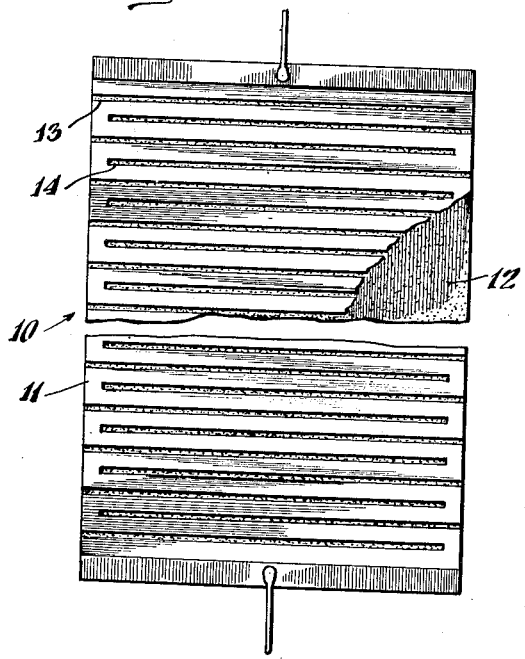
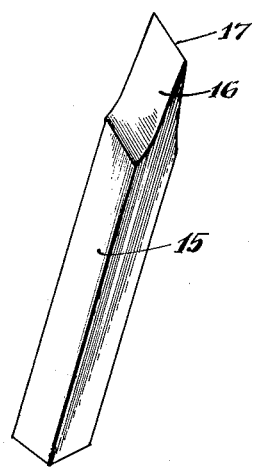
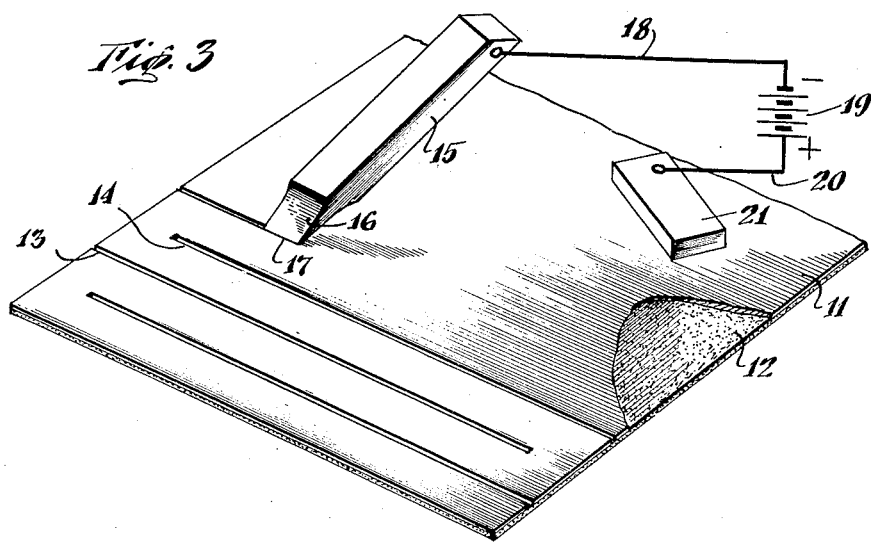
INVENTOR
Duncan B. Cox
BY
ATTORNEYS

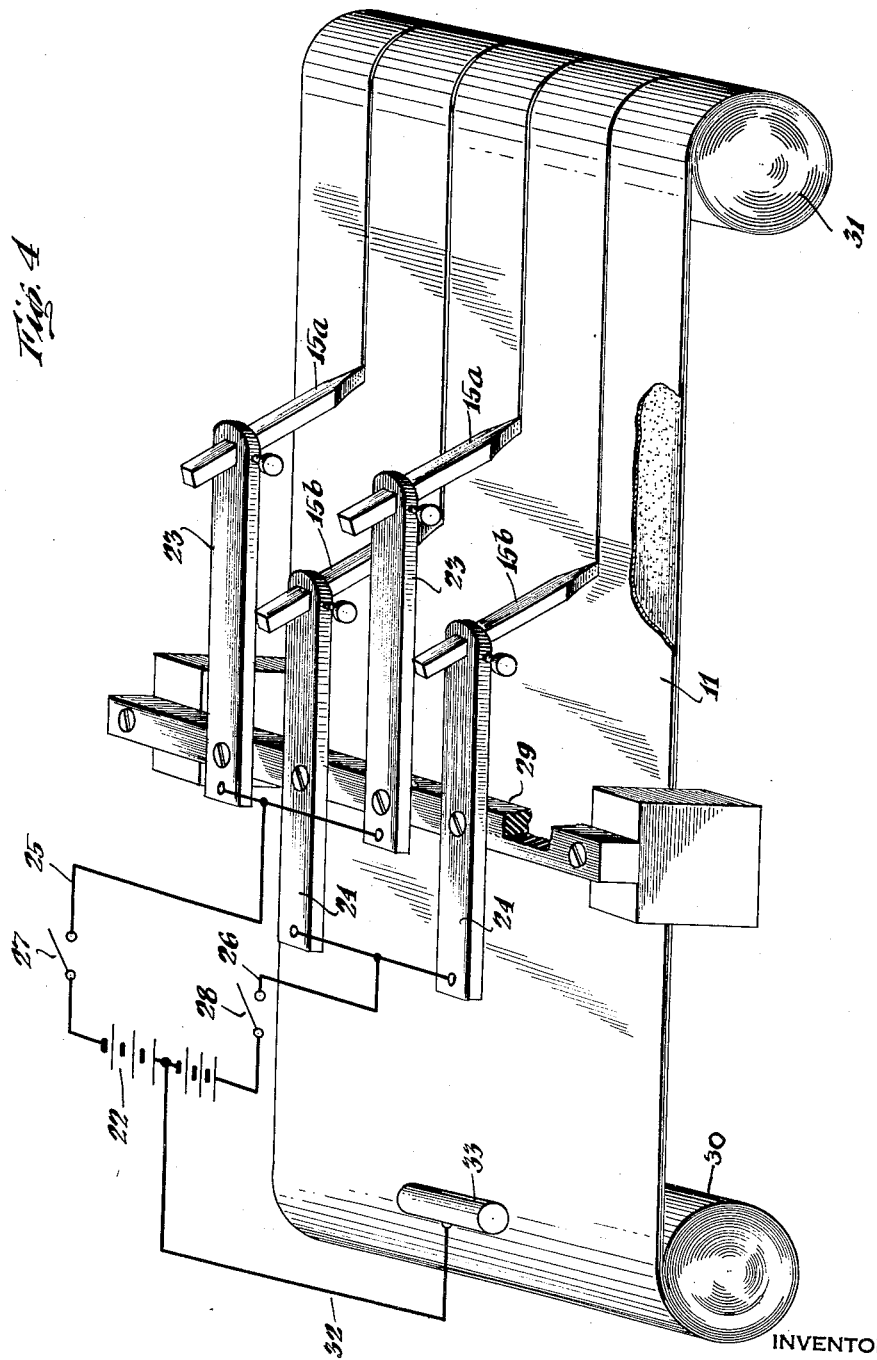

Patented June 1, 1954

2,680,184

UNITED STATES PATENT OFFICE 2,680,184

METHOD FOR SEVERING OR SLITTING METAL FOIL

Duncan B. Cox, Woodbury, N. Y.

Application February 7, 1951, Serial No. 209,795

4 Claims. (Cl. 219—19)

This invention relates to an improved method and apparatus for serving or slitting metal foil.

This application is a continuation in part of my copending patent application Serial No. 687,756 filed August 1, 1946, for Electric Heater and now abandoned.

In the fabrication of various articles, such as electric heating elements, from metal foil it is necessary to sever or slit the foil. Due to the very thin, flexible and fragile character of the material the severing and slitting of the foil presents difficulties since the foil can be readily distorted or damaged.

It is an object of the present invention to overcome these difficulties and to provide an improved method and apparatus whereby metal foil, even though it be extremely thin and fragile, can be readily severed or slit without damaging or distorting the foil.

A further object of the invention is to provide an improved method and apparatus of the above character which is relatively simple and inexpensive and can be readily utilized by relatively unskilled employees.

In the accompanying drawing—

Fig. 1 is an elevational view partially broken away of one type of metal foil article which may be fabricated by means of my method and apparatus;

Fig. 2 is a perspective view of the stylus or electrode used in severing or slitting the foil;

Fig. 3 illustrates one mode of using my improved stylus or electrode; and

Fig. 4 is a partially diagrammatic and partially perspective view illustrating a battery of electrodes being used to sever or slit metal foil.

My invention contemplates the severing or slitting of metal foil by electrically fusing or burning the foil through the medium of a stylus in the form of an electrode.

My method and apparatus may be used in fabricating various types of articles from metal foil where it is required to sever or to slit the foil. In Fig. 1 I have illustrated one type of article which may be made by my improved method and apparatus, namely, a heating element 10 consisting of a layer of metal foil 11 laminated to a backing sheet 12 made of suitable insulating material such as cellulose or asbestos paper, fabric or woven or felted glass fibre.

The foil sheet is formed with two sets of alternately arranged parallel slits 13 and 14 extending inwardly from opposite edges of the sheet as shown so as to form a continuous zigzag foil path from the top to the bottom of the panel. It will be noted that the slits 13 and 14 extend only through the foil sheet and that the backing sheet 12 remains intact serving as a support for the foil sheet.

The preferred types of foil to be slit by my improved method and apparatus are those made of lead, tin, zinc, aluminum and alloys thereof but other types can also be slit under suitable operating conditions.

In carrying out my method the foil sheet 11 is laminated to the backing sheet 12 by means of a suitable adhesive, prior to the formation of slits 13 and 14. The foil may then be severed or slit as desired by means of electrically fusing, burning or vaporizing the foil with a stylus in the form of an electrode made of a suitable conducting and refractory material such as tungsten or carbon. For this purpose, I have found that an electrode, of the type illustrated in Figs. 2 and 3, made of carbon gives very satisfactory results. Carbon has the advantage of being a good electrical conductor and at the same time is a poor heat conductor. In this connection the carbon should be free from clay and silicates as they interfere with or prevent the proper operation of my method. Also, the carbon should not be impregnated with metal since this increases the heat conductivity with the result that the heat will be rapidly conducted away from the point or edge of the stylus.

The electrode 15 may be of any convenient length. The lower end of the electrode is formed with a restricted terminal or contact area which may be in the form of a point or may be in the form of a relatively sharp edge generally wedge-shaped in cross-section extending across the base of the electrode as shown at 16. If it is wedge-shaped, the edge 17 is preferably disposed at an angle to the transverse axis of the electrode so as to facilitate the use of the electrode when it is drawn across the foil sheet as shown.

In using the electrode it is connected by a suitable wire 18 to one side of a source of direct electric current such as a battery 19. The other side of the battery is connected by lead 20 to contact 21 which rests upon the uncut end of the sheet of foil as shown in Fig. 3. When the restricted terminal area 17 of the stylus or electrode is brought into contact with the foil the circuit is completed from the battery through lead 18, electrode 15, foil 11, contact 21 and lead 20. When the point of contact between the electrode and the foil is caused to move across the foil the contacted portions of the metal are removed by fusing, vaporizing or burning thereby severing or slitting the foil.

For foils of the preferred type .002" or less in thickness, I have found that the optimum voltage usually lies between approximately 4 and 20 volts. The optimum voltage, in each case, will vary with the foil employed, the thickness of the foil and the nature of the backing material and adhesive used. As the voltage is increased above the optimum, the resulting slit becomes wider and progressively more irregular.

When the stylus is drawn across the foil it severs or slits the contacted portions of the foil only and the backing sheet and the remainder of the foil are left intact. The backing sheet serves as a support for the foil after it has been thus slit or severed. In this connection, in the performance of my method even though there is a visible arc at the electrode contacting point, at the proper operating voltage, the backing sheet is not subjected to damaging temperature. For example, a backing sheet of cellulose paper will be neither burned nor charred as the slit is made. If the motion of the electrode relative to the foil is stopped without lifting the electrode, the circuit is instantly opened, and no current is drawn until relative motion is re-established, whereupon the cutting action is instantly resumed.

In Fig. 4 I have illustrated a battery of electrodes being used to sever or slit the foil. The electrodes are suitably supported as indicated upon the arms 23 and 24 made of conducting material and which are connected by lead wires 25 and 26 respectively to the opposite sides of a suitable source of direct current such as battery 22 having a potential of twice the optimum voltage for slitting with a single electrode. Each lead 25 and 26 is provided with an appropriate interrupting switch 27 and 28 respectively. The arms 23 and 24 may be mounted as shown upon an appropriate bridge or bar 29 of insulating material extending across the path of movement of the foil 11 which as previously indicated, should have the backing sheet of insulating material laminated thereto.

The foil sheet is fed from supply roll 30 onto take-up roller 31 and in its path of movement passes beneath the bridge or bar 29 and is moved in contact with the lower ends of the electrodes 15A and 15B. The electrical center of the battery is connected to the foil by appropriate means such as lead 32 and contact member or brush 33 which engages the foil.

In operation, when both switches 27 and 28 are closed, the current flows primarily from one set of electrodes 15A through the points of contact into the foil and out through the points of contact of the other set of electrodes with substantially no current flow through contact member 33. Since the two sets of electrodes are in series with each other one-half of the battery potential appears across each of the points of contact. In other words, if the potential of battery 22 were 16 volts there would be 8 volts across each of the points of contact between the electrodes and the foil. This arrangement avoids the necessity of passing very heavy amperage through the foil contacting member 33. A further advantage is that the slits may be formed in very close relationship and in the absence of this arrangement the amperage would be so high that the foil would not be able to carry the amperage without fusing.

As shown in Fig. 4 the electrodes may be arranged in staggered relationship so that by simultaneously initiating and terminating the operation of the apparatus the slits are formed in the desired offset relationship of slits 13 and 14 of Fig. 1. The initiation and termination of the slitting and severing operation may be controlled either by means of switches 27 and 28 or by bringing the electrodes and foil out of and into contact with each other. It will also be appreciated that the circuit for one set of electrodes may be opened by its respective switch while the circuit for the other set of electrodes remains closed due to the provision of contact member 33. Thus, the circuit for the electrodes 15B may be interrupted by opening switch 28. Under those circumstances the circuit for the electrodes 15A is completed through the foil, the foil contact member 33 and lead 32 to the center point of the battery.

The arrangement shown in Fig. 4 may be duplicated or triplicated to increase the number of electrodes as desired.

My method and apparatus may be used for severing or slitting the foil in any desired form or configuration and the electrodes may either be used individually or in batteries so as to form a number of slits simultaneously. Also, under certain circumstances foil sheets may be severed or slit without any backing sheet applied thereto, particularly where it is desired to completely sever one piece of foil from another.

It will thus be seen that by means of my invention I have provided an improved method and apparatus for severing and slitting metal foil which is relatively simple and inexpensive, which can be readily performed even by unskilled employees and which minimizes the danger of damage or distortion of the foil sheet. Modifications may, of course, be made in the illustrated and described embodiment of my invention without departing from the invention as set forth in the accompanying claims.

I claim:

1. The method of severing or slitting a thin metal foil sheet which comprises: first providing a thin sheet of metal foil less than .002" in thickness with an insulating backing; then connecting the foil sheet to one side of a source of direct electric current having a potential between 4 volts and 20 volts; confining current from the other side of the source in a restricted terminal; and finally bringing the aforesaid restricted terminal into contact with the foil sheet and shifting it across those portions of the foil which it is desired to sever or slit so as to fuse and remove those portions of the metal foil while leaving the insulating backing and the remaining portions of the foil intact.

2. The method of severing or slitting a thin metal foil sheet as set forth in claim 1 in which the restricted terminal is a carbon electrode.

3. The method of severing or slitting a thin metal foil sheet which comprises: first providing a thin sheet of metal foil; confining current from the two sides of a source of direct electric current having twice the desired potential in two sets of restricted terminals; and then shifting both sets of terminals simultaneously over the foil which it is desired to sever or slit whereby the potential across each set of terminals and the foil is at the desired voltage and thereby to fuse and remove those portions of the foil leaving the remaining portions intact.

4. The method of severing or slitting a thin metal foil sheet which comprises: first providing a thin sheet of metal foil with an insulating backing; then confining current from the two sides of a source of direct electric current having twice the desired potential in two sets of restricted terminals; connecting the electrical center of the source directly to the foil; and finally shifting at least one set of terminals over those portions of the foil which it is desired to sever or slit whereby the potential across the last mentioned terminals and the foil is at the desired voltage and thereby to fuse and remove those portions of the foil while leaving the insulating backing and the remaining portions of the foil intact.

References Cited in the file of this patent

UNITED STATES PATENTS

| Number | Name | Date |
|---|---|---|
| 1,060,757 | Haskins | May 6, 1913 |
| 1,909,079 | Steerup | May 16, 1933 |
| 2,248,057 | Bond | July 8, 1941 |
| 2,435,441 | Grouse | Feb. 3, 1948 |
| 2,549,966 | Grouse | Apr. 24, 1951 |
| 2,597,511 | Mellen et al. | May 20, 1952 |

FOREIGN PATENTS

| Number | Country | Date |
|---|---|---|
| 262,272 | Great Britain | Dec. 9, 1926 |
| 396,934 | Great Britain | Aug. 17, 1933 |